United States Patent

[11] 3,591,284

[72] Inventor Solomon Liebman
6633 Woodman Ave., Van Nuys, Calif. 91405

[21] Appl. No 732,187
[22] Filed May 27, 1968
[45] Patented July 6, 1971

[54] PRINTED CIRCUIT LAYOUT MEANS
7 Claims, 5 Drawing Figs.

[52] U.S. Cl. .......... 355/75, 33/184.5
[51] Int. Cl. .......... G03b 27/62
[50] Field of Search .......... 355/72, 75, 78, 85, 112; 33/184.5, 1

[56] References Cited

UNITED STATES PATENTS

| | | | |
|---|---|---|---|
| 2,099,364 | 11/1937 | Hunter | 33/184.5 |
| 2,492,528 | 12/1949 | Huebner | 33/184.5 |
| 2,609,613 | 9/1952 | Capers | 33/184.5 |
| 2,825,976 | 3/1958 | Radencic | 33/184.5 |
| 3,067,666 | 12/1962 | Coffman | 33/184.5 X |
| 1,814,390 | 7/1931 | Johnson | 355/72 |
| 2,701,195 | 2/1955 | Fleischmann | 355/72 |
| 2,825,142 | 3/1958 | Johnson | 355/85 |
| 3,306,176 | 2/1967 | Myers | 355/91 |
| 3,399,593 | 9/1968 | Delp | 355/91 |

*Primary Examiner*—Samuel S. Matthews
*Assistant Examiner*—Richard L. Moses
*Attorney*—Donald R. Nyhagen

ABSTRACT: A printed circuit layout assembly is provided including a grid sheet and transparent circuit layout sheets to be placed in face to face contact with opposite sides of the grid sheet so as to permit layout on each layout sheet of a printed circuit diagram defining circuit conductors located in predetermined relation to grid lines on the grid sheet and hence in predetermined relation to circuit conductors of the diagram on the other layout sheet. The sheets are located and retained in registered relation by locating members positioned within aligned preformed locating holes in the sheets and having reference marks to be photographed with the completed circuit diagrams for providing a photographic image or record of each diagram containing reference mark images whose spacing may be measured to determine or check the scale of the photographic circuit image.

INVENTOR.
SOLOMON LIEBMAN

PRINTED CIRCUIT LAYOUT MEANS

BACKGROUND OF THE INVENTION

1. Field of the Invention

This invention relates generally to the art of fabricating printed circuits and has more particular reference to a novel printed circuit layout assembly for use in accurately laying out printed circuit diagrams and thereafter recording photographic images of the diagrams having an accurate scale relation to the original diagrams.

2. Prior Art

Printed circuits are now widely used in the electrical and electronic industries. The techniques employed to produce such circuits are many and varied. One of these techniques, and that with which the present invention is concerned, involves layout of a circuit diagram on a layout sheet, photographing the diagram, projecting the resulting photographic image onto the conductive layer of a circuit board coated with a photo resist composition, and final etching of the conductive layer in such a way as to form a completed printed circuit conforming to the original circuit diagram. As a general rule, the original circuit diagram is laid out on large scale, then photographically reduced in scale to the desired size of the final printed circuit. Most printed circuit boards are multilayer boards having at least two and often three or more circuit layers. In this case, the printed circuits of the several layers include circular conductive pads which are aligned to permit interconnection of conductors from one layer to the next by plating through drilled holes in the pads.

Layout of the original circuit diagrams in the above-described printed circuit technique may be accomplished in various ways. One of these layout methods, and that with which the present invention is concerned, involves the use of a grid sheet containing a rectangular coordinate system of mutually perpendicular grid lines, and a transparent circuit layout sheet for the circuit diagram of each printed circuit on the board. Each layout sheet is placed in face to face contact with the grid sheet. A desired circuit diagram is then laid out on the sheet, either by drawing the diagram on the sheet or, more commonly, by securing pressure sensitive tape elements, in the form of strips, spots, and the like, to the sheet to form the desired circuit diagram. In either case, the elements defining the conductors of the finished printed circuits (hereinafter referred to simply as conductors) are located in predetermined relation to the grid lines on the grid sheet which are visible through the layout sheet.

When making a two layer printed circuit board, two circuit layout sheets are placed in face to face contact with the grid sheet, and the circuit diagram is laid out on each sheet. In this case, the spots of the circuit diagrams which produce the pads of the completed printed circuits are aligned with selected grid lines on the grid sheets, such that the corresponding pads of the completed printed circuits will be aligned to permit interconnection of conductors of the several printed circuit layers by plating through drilled holes in the pads.

This layout of the original circuit diagram or diagrams presents one problem which the present invention seeks to solve. The problem referred to involves location and retention of the grid and circuit layout sheets in registered relation. At the present time, this is accomplished by visually aligning reference marks or crosses on the layout sheets with the grid lines on the grid sheet. However, this method of sheet alignment is unsatisfactory because of the alignment error possible with the method and the possibility of relative shifting of the sheets from their registered or aligned positions.

The existing printed circuit technique discussed above presents another difficulty with which the present invention is concerned. This difficulty involves accurately checking or determining the size or scale of the photographic images of the original circuit diagrams. In the existing printed circuit technique, this is accomplished by securing to the circuit layout sheets small pressure sensitive labels containing reference marks or lines which are photographically recorded with the circuit diagrams. The scale of the photographic circuit image is checked or determined by measuring the spacing between the reference mark images on the photographic recording. Knowing the spacing between the reference marks on the original circuit diagram layout sheets and the desired photographic scale change, if any, i.e., photographic reduction, it is obvious that the scale of the photographic circuit image may be checked by measuring the reference mark image spacing, as just mentioned.

This method of checking the printed circuit image size or scale is unsatisfactory because its accuracy depends on visual location or placement of the reference labels on the circuit layout sheets. Moreover, this placement of the labels on the sheets is tedious and time-consuming. Further, separate labels are required for each layout sheet, so that a large number of such labels must be maintained on hand.

SUMMARY OF THE INVENTION

According to the present invention, the above difficulties of the existing printed circuit techniques are avoided. One aspect of the invention, for example, is concerned with curing the problem discussed above relative to alignment of the grid and circuit layout sheets. This is accomplished by providing a printed circuit layout assembly having grid and circuit layout sheets which are prepunched or otherwise preformed with locating holes. These holes are accurately sized and so arranged that each hole in a layout sheet registers with the corresponding hole in the grid sheet, to form a hole pair, when the sheets are placed face to face in registered relation. Locating members or discs are provided for insertion into the aligned locating hole pairs to positively locate and retain the sheets in registered relation. The error attendant to visual alignment of the sheets, as currently practiced, is thus eliminated. Also, the alignment procedure is greatly simplified.

Another aspect of the invention is concerned with avoiding the earlier discussed problems which attend the existing method of checking the scale or size of the photographic circuit image. According to this aspect, the sheet locating members or discs are provided with reference marks or lines which are photographically recorded with the circuit diagrams to provide reference mark images whose spacing can be measured to check or determine the scale accuracy of the circuit image. A unique feature of the invention in this regard, then, resides in the fact that the locating members or discs serve a dual function, to wit, sheet alignment and photographic image scale determination.

At this point, attention is directed to the fact that the invention is disclosed herein in connection with its application to the fabrication of a two-layer circuit board. As will appear later, however, the invention is not limited to this application since it may be employed in connection with the manufacture of a simple or one-sided circuit board as well as multilayer boards with more than two layers.

DESCRIPTION OF THE PREFERRED EMBODIMENT

Referring now to these drawings, there is illustrated a circuit board layout assembly 10 according to the invention including a grid sheet 12 and two circuit board layout sheets 14. These sheets are rectangular in shape and comprise a material, such as Mylar, characterized by high dimensional stability. At least the layout sheets are transparent or translucent. The grid sheet 12 has a rectangular coordinate system of mutually perpendicular horizontal and vertical grid lines 16, 18 imprinted or otherwise formed on the sheet.

Figure 1:
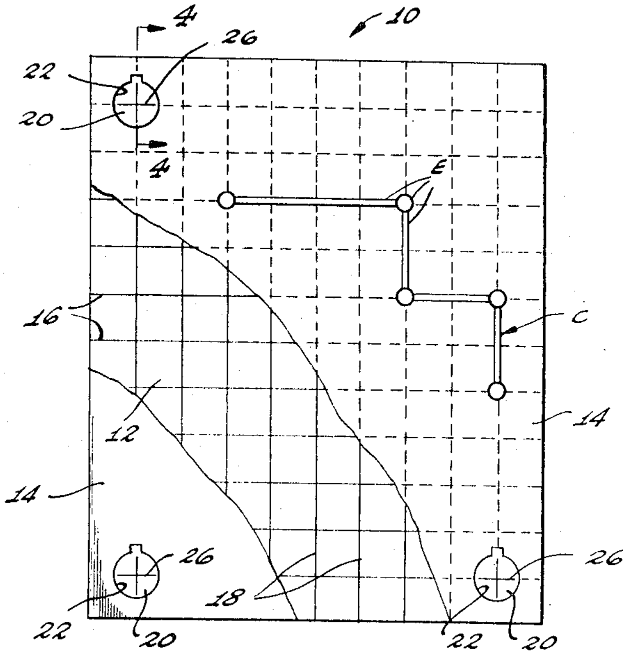
FIG. 1 is a plan view of a present printed circuit layout assembly with portions broken away for clarity.
Figure 2:
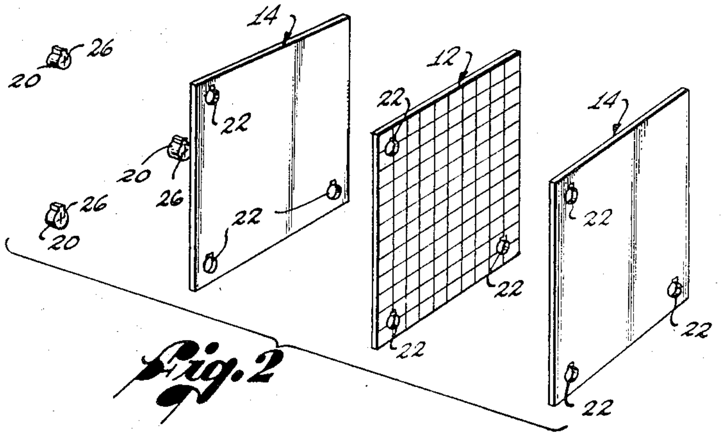
FIG. 2 is an exploded perspective view of the assembly on reduced scale.
Figure 3:
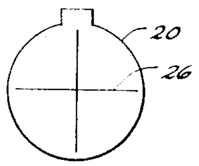
FIG. 3 is an enlarged detail of a present sheet locating or registering disc.
Figure 5:
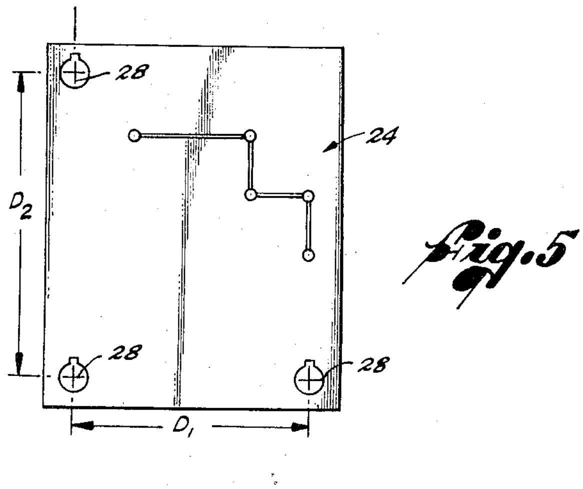
FIG. 5 illustrates the photographic image of one completed circuit diagram.
Figure 4:
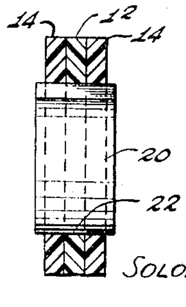
FIG. 4 is an enlarged section taken on line 4—4 in FIG. 1.

When preparing circuit diagrams, the layout sheets 14 are placed in face to face contact with opposite sides of the grid sheet 12, and in registered relation to the latter sheet wherein the several sheets are aligned, as shown in FIG. 1. The sheets are then secured in this relationship and a circuit diagram C is laid out on each layout sheet in the manner explained earlier. These diagrams define circuit elements or conductors E located in predetermined relation to the grid sheet grid lines 16, 18 which are visible through the layout sheets. The conductors of the two circuit diagrams are thus located in predetermined relation to one another, whereby selected conductors of the finished circuit boards may be interconnected through the board, as explained earlier. In actual practice, the layout sheets 14 may be assembled with the grid sheet 12 separately for layout of their respective circuit diagrams.

According to one aspect of the invention, the grid sheet 12 and layout sheets 14 are located in their registered or aligned positions by locating members 20 which fit, in close mating relation, within aligned locating holes 22 in the sheets. In the drawings, each sheet has three locating holes which are situated at three corners of the sheets, respectively. Each locating hole in the grid sheet registers with the corresponding holes in each layout sheet when the sheets are placed face to face and aligned. The aligned locating holes, then, form aligned hole pairs. When the three sheets are placed face to face, the sheets have three sets of aligned locating holes.

The illustrated sheet locating members 20 comprise discs which may be molded from plastic or otherwise formed. These discs are dimensioned radially to fit closely within the locating holes 22 in the grid and layout sheets 12, 14. The locating discs are dimensioned axially to have a thickness approximating the combined thickness of the total number of sheets to be registered, in this instance three. It is now evident, therefore, that the locating discs 20 may be employed to locate either or both layout sheets 14 relative to the grid sheet 12. The discs may be retained in their respective locating holes in any convenient way, as by applying pressure sensitive tape across the discs and sheets, as shown.

Each circuit diagram C is photographed, generally on a reduced scale, to provide a photographic image or record 24. This image is projected under the conductive layer of a circuit board coated with a photoresist material. The circuit board is then etched to provide the final printed circuit. In order to assure a satisfactory printed circuit, it is necessary to check the scale or size of the photographic circuit image to ascertain that the correct scale change, i.e., scale reduction, was accomplished during photographing of the circuit diagram.

According to a second aspect of the present invention, the locating discs 20 are provided with reference marks 26 for this purpose. These reference marks are photographed along with each printed circuit diagram C to provide on the resulting photographic image or record 24 images 28 of the reference marks. The spacing $D_1$, $D_2$ between the reference mark images can then be measured to check the scale of the photographic circuit image. To aid this checking operation, each reference mark 26 comprises cross hairs or lines which are centered on their respective locating discs 20 and extend parallel to the grid sheet grid lines 16, 18, as shown. In order to retain the reference lines and grid lines in this parallel relation, the locating discs 20 and locating holes 22 have complementary noncircular shapes, such as those shown.

At this point, attention is directed to the fact that while the invention has been disclosed in connection with the fabrication of a two-layer printed circuit board, the circuit board technique of the invention may be utilized to fabricate a one-layer circuit board as well as multilayer circuit boards having more than two circuit layers. In the latter case, the disclosed technique of the invention is modified only to the extent that additional layout sheets for the additional circuit layers are successively placed over the grid sheet and circuits are laid out on the additional layout sheets in the manner heretofore explained.

In the event that the axial length of the locating discs 20 which are used to align or register the layout and grid sheets during layout of the printed circuit diagrams is so great as to interfere with contact printing of the layout sheets, additional locating discs of a single sheet in thickness may be used during contact printing. The cross hairs 26 will be placed on these latter discs.

While the invention has been disclosed in connection with one physical embodiment thereof, it will be evident to those versed in the art that various modifications of the invention are possible within the spirit and scope of the following claims.

What I claim as new in support of Letters Patent is:

1. A printed circuit layout assembly comprising: a grid sheet having mutually perpendicular grid lines;

a transparent circuit layout sheet to be placed in face to face contact with either side of said grid sheet;

said sheets having preformed locating holes which are arranged to register with one another when said sheets are placed face to face in registered relation in such manner that each hole in said grid sheet and the corresponding hole in said layout sheet provide a pair of aligned holes;

locating discs to be positioned within said hole pairs, respectively, for locating and retaining said sheets in said registered relation to permit layout on the exposed side of said layout sheet of a printed circuit diagram defining conductors located in predetermined relation to said grid lines; and said locating discs having a thickness approximately equal to the combined thickness of said sheets, such that said discs may be placed in said grid sheet holes with either end of said discs projecting beyond the adjacent side of the grid sheet to locate said layout sheet relative to the respective grid sheet side without removing said discs from said grid sheet.

2. A printed circuit layout assembly comprising:

a grid sheet having mutually perpendicular grid lines;

a transparent circuit layout sheet to be placed in face to face contact with either side of said grid sheet;

a second transparent circuit layout sheet to be placed in face to face contact with the opposite side of said grid sheet;

said sheets having preformed locating holes which are arranged to register with one another when said sheets are placed face to face in registered relation in such manner that the sheets have sets of aligned holes;

locating discs to be positioned within said aligned hole sets, respectively, for locating and retaining said sheets in registered relation to permit layout on the exposed sides of said layout sheets of printed circuit diagrams defining conductors located in predetermined relation to said grid lines and to one another; and said locating discs having a thickness approximately equal to the combined thickness of said sheets, such that said discs may be placed in said grid sheet holes with the ends of discs projecting beyond the adjacent sides of said grid sheet to locate said layout sheets relative to said grid sheet.

3. A printed circuit layout assembly according to claim 1 including:

means for releasably retaining said locating discs in their respective locating holes.

4. A printed circuit layout assembly according to claim 1 wherein:

said locating discs are adapted to be positioned within said layout sheet holes with a surface of each disc substantially flush with said exposed side of said layout sheet, said surface of each locating disc has a reference mark, said layout sheet is adapted to be photographed after completion of said circuit diagram with said locating discs in their flush positions within said layout sheet holes to provide a photographic image of said circuit diagram and reference marks, and the distances between the reference marks on said photographic image are adapted to be measured to check the scale of said image.

5. A printed circuit layout assembly according to claim 4 wherein:

said reference marks comprise crossed lines on said discs, and said discs and sheet holes have complementary noncircular shapes for orienting said discs in their respective holes in positions wherein said crossed lines parallel said grid lines, respectively.

6. A printed circuit layout assembly according to claim 2 wherein:

said locating discs are adapted to be positioned within said layout sheet holes with a surface of each disc substantially flush with said exposed side of said layout sheet, said surface of each locating disc has a reference mark, said layout sheet is adapted to be photographed after completion of said circuit diagram with said locating discs in their flush positions within said layout sheet holes to provide a photographic image of said circuit diagram and reference marks, and the distances between the reference marks on said photographic image are adapted to be measured to check the scale of said image.

7. A printed circuit layout assembly according to claim 6 wherein:

said reference marks comprise crossed lines on said discs, and said discs and sheet holes have complementary noncircular shapes for orienting said discs in their respective holes in positions wherein said crossed lines parallel said grid lines, respectively.